United States Patent [19]
Buskirk et al.

[11] Patent Number: 5,987,307
[45] Date of Patent: Nov. 16, 1999

[54] POWER CONTROL IN WIRELESS RADIO TRANCEIVERS

[75] Inventors: Stephen Buskirk, San Marcos; Donald R. Green, Jr., Carlsbad, both of Calif.

[73] Assignee: Denso Corporation, Aichi-ken, Japan

[21] Appl. No.: 09/169,849

[22] Filed: Oct. 9, 1998

[51] Int. Cl.[6] ........................................ H04B 1/38
[52] U.S. Cl. ........................ 455/73; 375/219; 375/297
[58] Field of Search .................... 455/126, 127, 455/116, 115, 119, 73; 375/219, 221, 296, 297; 330/127

[56] References Cited

U.S. PATENT DOCUMENTS

| | | | |
|---|---|---|---|
| 5,193,223 | 3/1993 | Walczak et al. | 455/115 |
| 5,438,683 | 8/1995 | Durtler et al. | 455/74 |
| 5,841,319 | 1/1997 | Sato | 330/129 |
| 5,880,635 | 4/1997 | Satoh | 330/144 |

*Primary Examiner*—Wellington Chin
*Assistant Examiner*—Congvan Tran
*Attorney, Agent, or Firm*—Fish & Richardson P.C.

[57] ABSTRACT

A radio transceiver having an event-driven power control circuit that commands a digital processor to perform power control processing only when the output power exceeds a predetermined power range.

7 Claims, 6 Drawing Sheets

POWER CONTROL IN WIRELESS RADIO TRANCEIVERS

FIELD OF THE INVENTION

The present invention relates to power control in wireless radio transceivers, and more particularly, to methods and circuits for controlling transmitting power of cellular phone handsets.

BACKGROUND

Many wireless radio communication systems use one or more base stations and a plurality of transceivers that communicate with the base stations. The transmitting power of each transceiver must exceed a minimum level in order to achieve an acceptable signal-to-noise ratio at the respective receiving base station. The signal strength of a transceiver received at the receiving base station can be increased by increasing the transmitting power of each transceiver. However, when two or more transceivers are communicating with a base station in a shared radiation frequency bandwidth, the communication signals produced by the transceivers may interfere with one another and hence can degrade the signals received at the receiving base station. Therefore, there is an upper limit to the maximum transmitting power of each transceiver.

Other restrictions may also limit the upper limit of the transmitting power of a transceiver. For example, if the transmitting power of one transceiver is too high when communicating with one base station that is adjacent to another base station, an sufficient amount of the transmitting signal may be received by the adjacent base station to which the signal is not intended to send. This may adversely affect the operation of the adjacent base station. For another example, undesirable sidebands may be generated by modulation or nonlinear distortion due to operation at a high power. These sidebands may also adversely affect other base stations or even a different wireless radio communication system that operates at a different radio frequency.

A cellular phone system, including both analog and digital systems, is one example of the above wireless radio communication system. A digital cellular phone system such a code division multiple access ("CDMA") system, a time division multiple access ("TDMA") system, or a frequency division multiple access ("FDMA") system , for example, is often required to limit the transmitting power of each handset within a specified power range defined by predetermined maximum and minimum power levels. Such power range for handsets for a particular cellular system is specified by a respective cellular system standard. IS-95 and IS-54, for example, are the current US standards for CDMA and TDMA systems, respectively.

The transmitted power level of a handset can be preset at a desired level within a specified power range. However, the transmitted power is often subject to variation due to the temperature variation, frequency drift or other changing conditions. Such power variation may cause the transmitted power drift out of the specified range. Hence, it is desirable to implement a power control mechanism in a handset. For a given cellular system standard, different methods and circuits may be used to implement the specified power range.

U.S. Pat. No. 5,193,223 to Walczak and Cahill discloses one implementation of such power control for a TDMA cellular phone by repeatedly sampling and adjusting the transmitting power levels. For each sampled output power level, a desired power level and the actual transmitted power level is compared to determine the difference therebetween. The gain of a variable gain stage in the output signal path is then adjusted to reduce the difference.

One limitation of the above implementation is that a digital controller in the handset needs to respond to a sampled power level each and every time to produce a command that would change the gain of the variable gain stage in a desired manner. The digital controller is configured to do so even when the sampled transmitted power indicates that the transmitted power is at a desired value within the specified power range. This prevents the digital controller from performing other processing tasks or reduces the amount of processing power of the digital controller for processing other tasks during the period when the comparison of power levels is performed.

SUMMARY

The present disclosure provides an alternative power control method and circuit for a radio transceiver, and a cellular phone in particular, to overcome the above limitations. The power control circuit continuously monitors the transmitted power but generates an interrupt to adjust the transmitter power only when the transmitted power is out of a specified power range.

One embodiment of the radio transceiver includes a variable gain amplifier receiving and amplifying a modulated IF signal, a frequency mixer converting the modulated IF signal from the variable gain amplifier to an RF frequency to generate an RF signal, an RF amplifier amplifying the RF signal for transmission, and a power control loop that detects the power of the transmitted RF signal and adjusts the gain of the variable gain amplifier only when the transmitted power exceeds a predetermined power range.

More specifically, one preferred power control loop includes an RF power detector, a signal comparator, an interrupt generator, a digital controller, and a digital-to-analog converter. The RF power detector is connected to receive a portion of the transmitted RF power to indicate the transmitted RF power. The signal comparator, receiving at least one power reference signal indicating the predetermined power range, compares the transmitted RF power with the power reference signal to determine whether the transmitted power exceeds the predetermined power range. The interrupt generator is connected to receive the output from the comparator and to generate an interrupt signal only when the transmitter power exceeds the predetermined power range. When an interrupt signal is received, the digital controller generates a power control command to adjust a gain of the variable gain amplifier according to the interrupt signal.

One feature of disclosed power control method and circuit is the event-driven property of the power control loop. When the comparator determines that the transmitted power is within the predetermined power range, no interrupt signal is generated. The gain of the variable gain amplifier is not adjusted. The digital controller is not used to do any processing with respect to power control but continues to perform other processing tasks such as call processing and user interface processing, without interrupt. When the transmitted power is out of the predetermined power range, the interrupt signal instructs the digital controller either to increase or decrease the transmitted power.

These and other aspects and advantages of the present invention will become more apparent in light of the following detailed description, the accompanying drawings, and the claims.

DETAILED DESCRIPTION OF THE PREFERRED EMBODIMENTS

Figure 1:
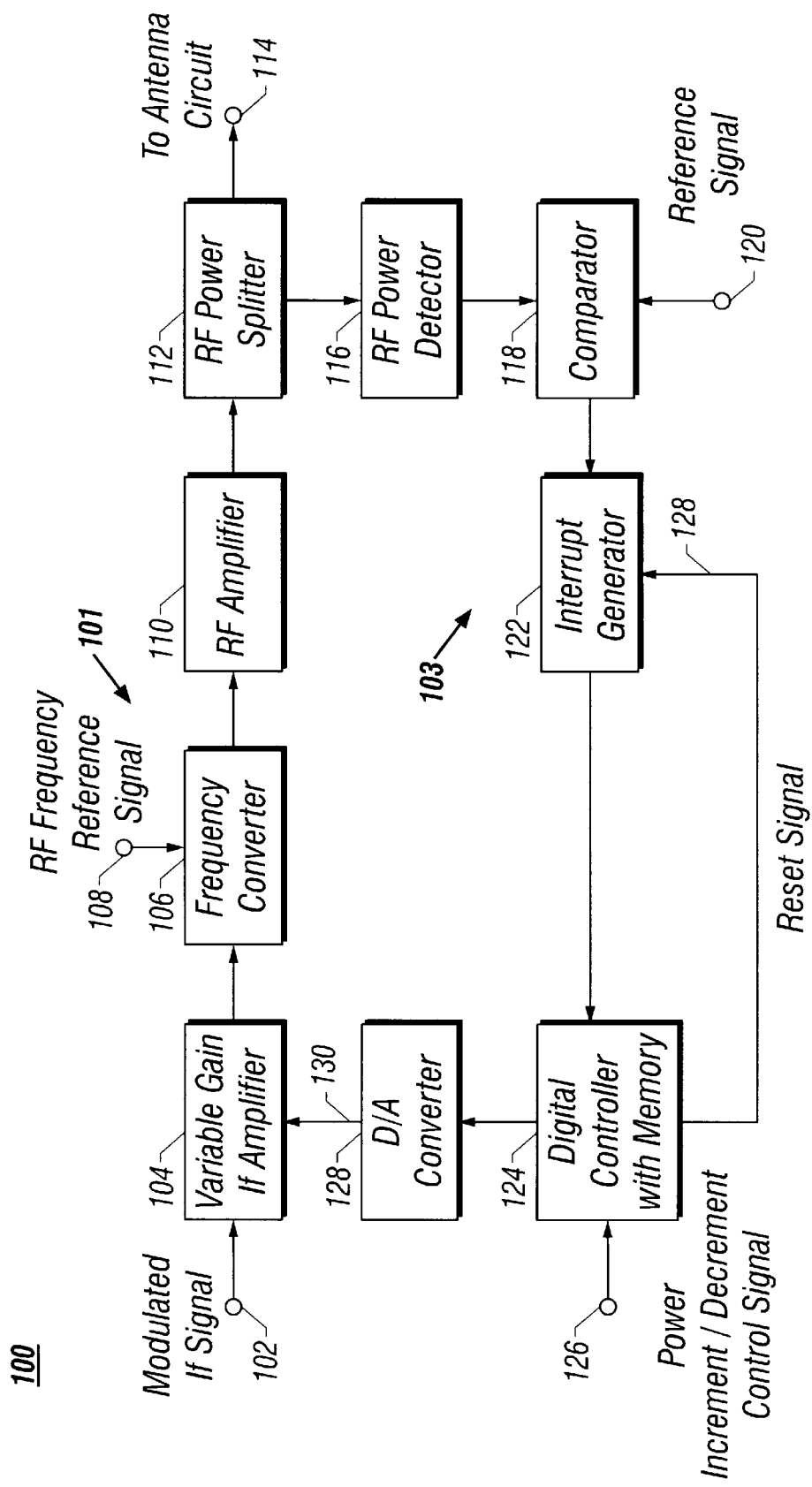
FIG. 1 is block diagram showing one embodiment 100 of a wireless radio transceiver having a signal transmission path and an event-driven power control loop.

FIG. 1 shows one embodiment 100 of a wireless radio transceiver having a signal transmission path 101 and an event-driven power control loop 103. The signal transmission path 101 has a variable gain amplifier 104 with an input terminal 102 for receiving an input IF signal, a frequency mixer 106 converting the modulated IF signal from the variable gain amplifier into an RF signal based on an RF frequency reference signal 108, an RF amplifier 110 amplifying the RF signal for transmission, and an RF power splitter 112 to route a small portion of the transmitted power as input to the power control loop 103 and to output the remaining RF power 114 to an antenna circuit for transmission to a base station.

The modulated IF signal includes data to be transmitted. For digital cellular phone applications, the transceiver 100 is configured to have a microphone and a speech coder to covert a speech signal into digital data bits in a proper format. The speech may be implemented with different coding systems such as CDMA and TDMA, for example. The RF frequency reference signal in CDMA cellular phone Systems is assigned in the 824–849 MHZ band for transmission to the base station according to the IS-95 standard. The link from the base station to the transceiver is assigned in the 869–894 MHZ band. For CDMA PCS systems, the RF frequency reference signal is assigned to a band from 1850 to 1910 MHZ for a reverse link and the band from 1930–1960 MHZ is assigned for a forward link.

The variable gain amplifier 104 receives a power control signal 130 from the power control loop 103 and changes the gain accordingly to confine the transmitted power within a predetermined power range or a desired power level. The power control loop 103 will now be described with a specific reference to a CDMA system to illustrate the construction and operation. It should be understood that such a power control can be applied to systems other than CDMA systems, such as a TDMA system.

For CDMA systems, each mobile standard, such as IS-95, IS-98, or J-STD-018, requires the maximum transmitted power of a handset above a specified lower power limit at 23 dBm and below a specified upper power limit at 30 dBm. Preferably, the maximum transmitted power is as low as possible to reduce signal distortion and interference and to reduce the unnecessary power usage as long as the maximum transmitted power is above the specified lower limit. Hence, in implementing the IS-95 specification, the actual upper power limit for the maximum transmitted power may be set at a level lower than the specified upper level in IS-95 but higher than the specified lower limit, for example, 24 dBm. However implemented, a CDMA handset has an upper maximum power limit and a lower maximum power limit which define a desired power range for the maximum transmitted power.

Referring to FIG. 1, the power control loop 103 includes an RF power detector 116, a signal comparator 118, an interrupt generator 122, a digital controller 124, and a digital-to-analog converter 128. The digital controller 124 produces a digital power control command, in response to either a power command 126 from the base station or an interrupt signal from the interrupt generator 122, to adjust the gain of the variable gain amplifier 104, thereby changing the transmitted power. The digital-to-analog converter 128 converts the digital power control command into an analog power control signal 130 which is received by the amplifier 104.

The digital controller 124 can be programmed to limit the maximum transmitted power from the transceiver 100. An internal parameter, "TX limit parameter", for example, can be implemented in the digital controller 124 to limit the maximum transmitted power below a predetermined level, "TX limit". For a given TX limit parameter, the digital controller cannot issue a digital power control command to increase the transmitted power above the TX limit. A base station, for example, may command such a transceiver 100 to increase its transmitted power up to but no more than the TX limit.

The TX limit, however, is adjustable by changing the TX limit parameter when necessary. The TX limit can be set at any value up to the full power capacity of the signal transmission path 101. To meet the CDMA power specification, the TX limit is set and can be adjusted at any value within the desired power range for the maximum transmitted power.

The power control loop 103 in FIG. 1 is designed to restrict the transmitted RF power below the upper maximum power limit and to maintain the maximum transmitted RF power within the desired power range (i.e., above the lower maximum power limit). The transmitted RF power is monitored by the RF power detector 116 which is connected to the RF power splitter 112. The RF power detector 116 receives a portion of the transmitted RF power and produces an averaged signal to indicate the envelope of the transmitted RF power at the antenna circuit. The signal comparator 118, receiving at least one power reference signal 120 which indicates the predetermined power range for the maximum transmitted power, compares the transmitted RF power with the power reference signal 120 to determine whether the transmitted power exceeds the upper maximum power limit and the maximum transmitted power falls below the lower maximum power limit. The comparator 118 can be configured in such a way that its output can indicate the comparison results.

Next in the loop 103, the output of the comparator 118 is fed into the interrupt generator 122 to control the generation of the interrupt signals. An interrupt signal is generated to require processing of the digital controller 124 only under two conditions. First, an interrupt signal is generated to reduce the transmitted RF power when the transmitter RF power exceeds the upper maximum power limit. Second, an interrupt signal is generated to increase the TX limit when the maximum transmitted RF power is below the lower maximum power limit.

The interrupt signal represents whether the transmitted power exceeds the upper maximum power limit or the maximum transmitted power is below the lower maximum power limit. However, this interrupt signal does not indicate the amount of the difference between the actual transmitted power and a desired power level. The power control loop 103 does not rely on the exact amount of the above difference to adjust the gain of the variable amplifier 104. Instead, the digital controller 124 adjusts the variable gain by a predetermined amount or the TX limit parameter by a predetermined amount in response to an interrupt signal.

Hence, the implementation of the interrupt generator 122 reduces the computing load of the digital controller 124 in at least the following two ways.

First, the interrupt generator 122 is event-driven and the digital controller 124 is only commanded to handle power control when needed. In normal operation when the transmitted power meets the requirements, no interrupt signal is raised. The digital controller 124 performs other processing tasks such as handing calls and does not processing any data in the power control loop 103 even though the power detector 116 and the comparator 118 continuously monitor the transmitted power. When an interrupt is raised, the digital controller 124 responds by either generating a proper power control signal to change the gain of the variable amplifier 104 or changing the TX limit parameter. Upon completion of a response to an interrupt signal, the digital controller 124 communicates with the interrupt generator 122 by a reset signal 128 to terminate the interrupt signal and reset the interrupt generator 122 to its neutral state of "no interrupt" (e.g., a value of 0). This completes one power adjustment. The digital controller 124 will be performing other processing tasks until another interrupt signal is received.

Second, when an interrupt occurs, the digital controller 124 does not have to determine (1) whether to increase or decrease either the gain of the variable amplifier 104 or the TX limit parameter and (2) the exact amount of change in either the gain of the variable amplifier 104 or the TX limit parameter. The item (1) is already indicated by the interrupt signal. The item (2) is preset and is stored in the memory of the digital controller 124. All of the above structure and operations are preferably carried out in a digital signal processor ("DSP").

In many cellular phone systems, the transmitted power is turned on and off in a selected duty cycle. Hence, the averaged output signal from the RF power detector 116 is also modulated by this duty cycle. Therefore, in order to produce a true comparison between the power levels of the reference signal 120 and the transmitted power, the reference signal 120 should also be modulated at the duty cycle in synchronization with the averaged output signal of the power detector 116. One way to modulate the reference signal by the duty cycle is to multiply the constant reference signal directly by a duty cycle signal that is used to turn on and off the transmission.

The reference signal 120 may include a signal indicating the upper maximum power limit, or a signal indicating the lower maximum power limit, or both. As an example, FIGS. 2A–2E show how the power control loop 103 controls the transmitted power below the upper maximum power limit.

Figure 2:
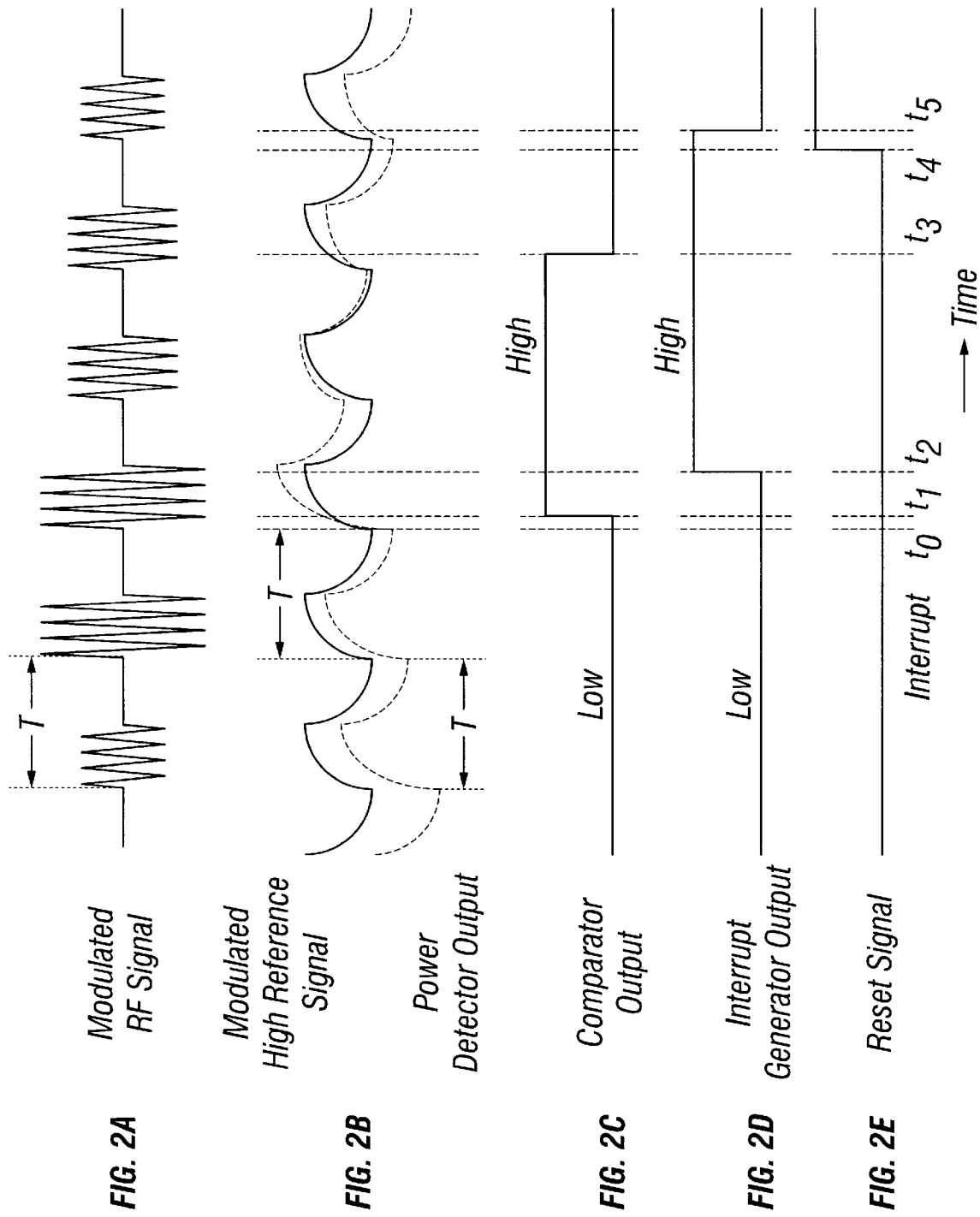
FIGS. 2A, 2B, 2C, 2D and 2E are timing charts to illustrate the operation of the power control loop shown in FIG. 1.

FIG. 2A shows a modulated RF signal that is transmitted to a base station by the transceiver 100 of FIG. 1. The duty cycle of the RF transmission is indicated by T. The averaged output signal form the power detector 116 is indicated by the dashed line in FIG. 2B. A modulated high reference signal is shown by the solid line in FIG. 2B. Prior to time t0, the transmitted power is below the upper limit. Referring to FIG. 2C, the comparator output is low, indicating that the transmitted power is within the specified power range. At time t0, the transmitted power exceeds the upper limit. At a later time t1, the comparator 118 detects this change and outputs a high, indicating the power is higher than the upper power limit. At time t2, the interrupt generator 122 initiates an interrupt by setting its output from a low to a high. This interrupt triggers the digital controller 124 to command the variable gain amplifier 104 to reduce the gain, thus decreasing the transmitted power below the upper power limit at t3. A reset signal is generated by the digital controller at time t4 which terminates the interrupt signal at time t5.

If the preselected amount of adjustment to the gain does not reduce the transmitted power below the upper limit, the comparator output remains high after time t1. This causes another interrupt signal to be generated. The digital controller 124 responds to these interrupt signals to further decrease the gain of the amplifier 104. This process may be repeated until the comparator output is changed.

Figure 3:
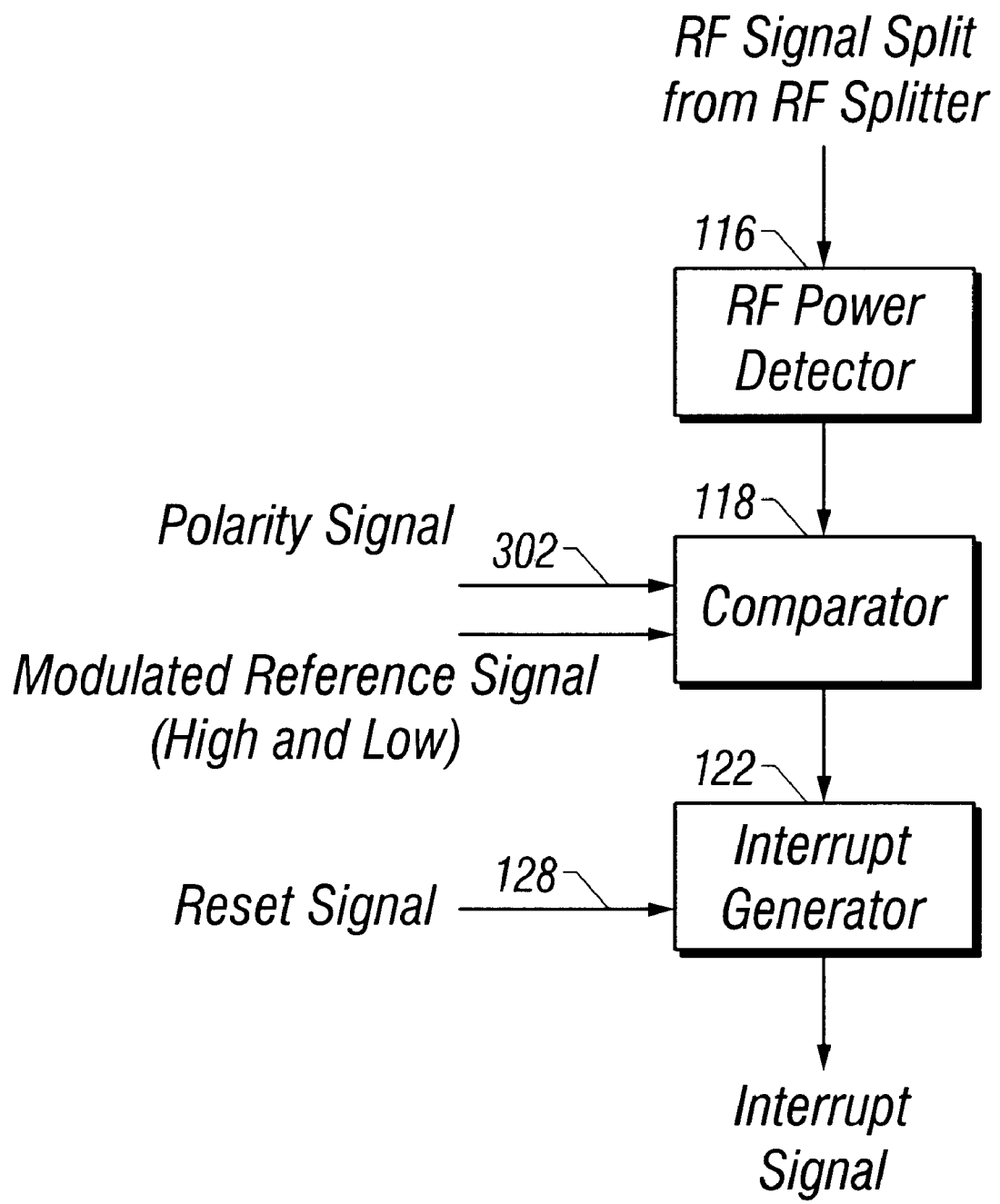
FIG. 3 is a block diagram showing a modified power control loop with one comparator and one interrupt generator to monitor the transmitted power against both the upper and lower power limits.

Operation of maintaining the power above the lower maximum power limit is similar except that the input polarity of the comparator 118 is reversed. The power control loop 103 may be modified to monitor both upper and lower power limits. FIG. 3 shows part of the power control loop with a modified comparator 118. A polarity signal 302 is used to change the polarity of the two inputs, one for the modulated reference signal and another one for the averaged output from the power detector 116. This allows for comparing the transmitted power against both the upper and the lower power limits.

Assume an operational amplifier is used as the comparator 118. When monitoring whether the transmitted power exceeds the upper maximum power limit, the polarity signal 302 sets the modulated reference signal for the upper maximum limit as an input to the inverting input and the output from the power detector 116 as an input to the non-inverting input. The polarity signal 302 reverses the input polarity when the modulated reference signal is for the lower maximum power limit: the reference signal is input to the non-inverting input and the output from the power detector 116 is input to the inverting input. The operation of the digital controller 124 remains the same. Hence, the modulated reference signal may be changed, e.g., alternatively, to represent the upper maximum power limit and the lower maximum power limit.

For example, the reference signal may be first set to represent the upper maximum power limit and the polarity of the comparator is selected accordingly. If there is an interrupt, the digital controller responds to reduce the gain of the variable gain amplifier and resets the interrupt generator. When there is no interrupt with respect to the upper maximum power limit, the reference signal is set to represent the lower maximum power limit. If there is an interrupt indicating the power is below the lower maximum power limit when the transmitted power is at its TX limit, the digital controller increases the TX limit by a preset amount. If there is no interrupt with respect to the lower power limit, the reference signal is set again to represent the upper power limit. The above process repeats to ensure the transmitted power stay within the predetermined power range.

Figure 4:
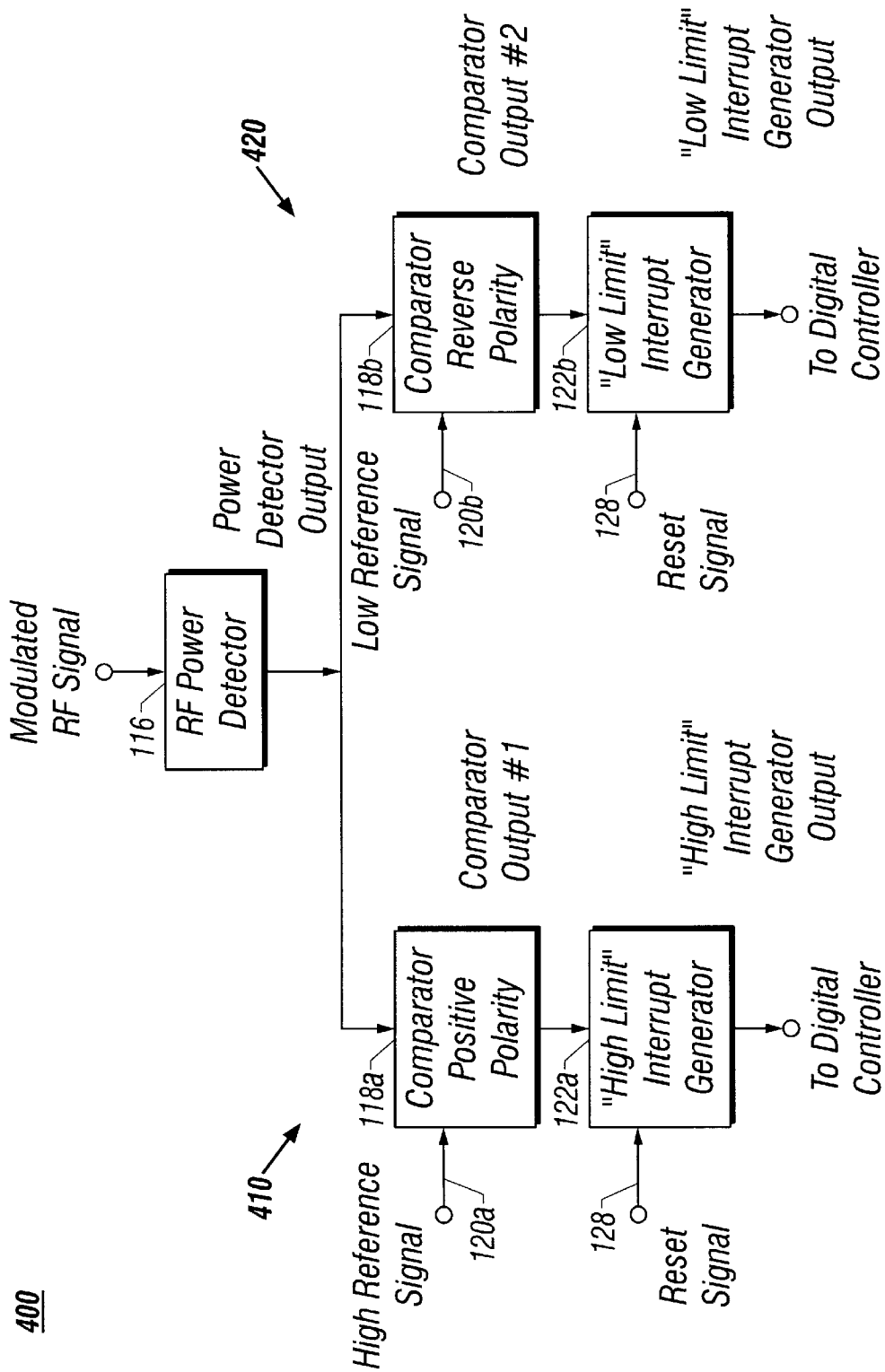
FIG. 4 is a block diagram of an alternate power control loop using two parallel interrupt paths to monitor the transmitted power against both the upper and lower power limits.

An alternate embodiment of the power control loop 103 for simultaneously monitoring both the upper and lower maximum power limits is shown in FIG. 4. The output of the RF power detector 116 is sent to two parallel interrupt paths, a path 510 for monitoring whether the transmitted power exceeds the upper maximum power limit and a path 520 for monitoring whether the transmitted power falls below the lower maximum power limit when the transmitted power is at the TX limit. Comparators 118a and 118b in the two paths 410 and 420 have opposite polarities so that the operation of the digital controller 124 remains the same in response to an interrupt signal from either the path 410 or the path 420.

Hence, a CDMA handset based on the transceiver 100 shown in FIG. 1 has at least three power control mechanisms in addition to an open loop power estimate in which a handset estimates and adjusts the transmitting power based on the signal strength in the forward link when it is initially linked to a base station. First, the base station will control the gain of the amplifier 104 by power control signals 126 in the forward link. Second, the TX limit set by the digital controller 124 limits the gain of the amplifier 104. This TX limit overrides the power control signals 126 from the base station. Third, the event-driven control loop 103 based on operation of the interrupt generator 122 further controls the gain of the amplifier 104 to restrain the transmitted power within the desired power range.

The tolerance levels for different power control mechanisms are different in CDMA systems. For power control commanded by a base station, the power adjustment is coarse, e.g., about 1 dB per step. The open loop estimate is about ⅓ dB per step. The adjustment for the TX limit is a fine adjustment, at about 1/12 dB per step.

Figure 5:
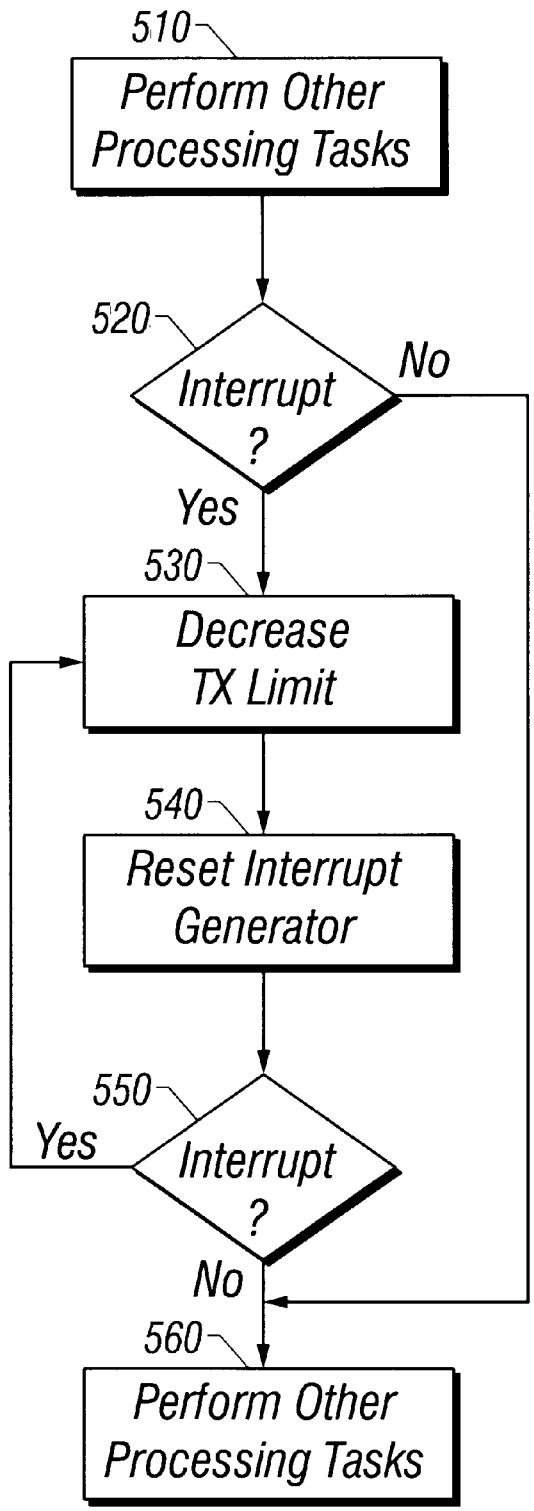
FIG. 5 is a flowchart showing one mode of operation of the digital controller in the transceiver of FIG. 1 when the reference signal represents an upper power limit for the transmitted power.

FIG. 5 is a flowchart showing the operation of the digital controller 124 when the power control loop 103 is configured to only limit the transmitted power below the upper maximum power limit. In this configuration, the reference signal 120 is modulated by the duty cycle signal to represent only the upper maximum power limit.

In normal operation as shown by steps 510 and 560, when no interrupt is received from the interrupt generator 122, the digital controller 124 performs other processing tasks unless the base station commands the digital controller 124 via the signals 126 to change the transmitted power. When an interrupt signal is generated to indicate that the transmitted power exceeds the upper maximum power limit, the digital controller 124 decreases the TX limit parameter by a predetermined amount and then resets the interrupt generator 122. This is shown by steps 520, 530, and 540. Upon resetting the interrupt at step 540, if no interrupt is received, the digital controller 124 performs other processing tasks (step 560); otherwise the digital controller 124 repeats steps 530 and 540 to further reduce the TX limit until the TX limit is below the upper maximum power limit.

When the power control loop is implemented as in FIG. 3, both upper and lower maximum power limits can be monitored by using a single comparator 118 with a polarity signal 302. One embodiment of the operation of the digital controller 124 for such a CDMA handset is shown in FIG. 5.

When the transmitted power is below the TX limit and within the desired power range, the digital controller 124 performs other processing tasks (step 610) unless the base station commands the digital controller 124 via the signals 126 to change the transmitted power.

Decision step 620 promotes the digital controller 124 to first determine whether the TX limit is reached. If the TX limit is reached, the digital controller 124 handles the TX limit by carrying steps 630 through 660; otherwise the digital controller 124 determines whether an interrupt is generated (step 680).

When the transmitted power reaches the TX limit, the digital controller 124 reduces the TX limit parameter by the predetermined amount at step 630. Next, at step 640, the polarity signal 402 sets the comparator to compare the transmitted power to the modulated low reference signal. If no interrupted is generated, the comparator is set to compare the transmitted power to the modulated high reference signal in step 670. Otherwise, an interrupt is generated to indicate the TX limit is below the lower power limit. Hence at step 650, the TX limit parameter is increased. The interrupt generator 122 is then reset at step 660. Next, the decision step 665 is carried out to see whether there is another interrupt. If there is an interrupt, steps 650 through 665 are repeated until the maximum transmitted power is above the lower maximum power limit.

The step 670 follows. The comparator 118 is set by the polarity signal to compare the transmitted power to the upper maximum power limit. If the transmitted power is below the upper power limit, no interrupt is generated and the digital controller 124 terminates power control processing to perform other processing tasks in step 694. Otherwise, an interrupt is generated to command the digital controller 124 to reduce the TX limit at step 690. At step 692, the interrupt generator 122 is reset. If no other interrupt signal is received, the digital controller 124 terminates power control processing to perform other processing tasks (step 694).

Figure 6:
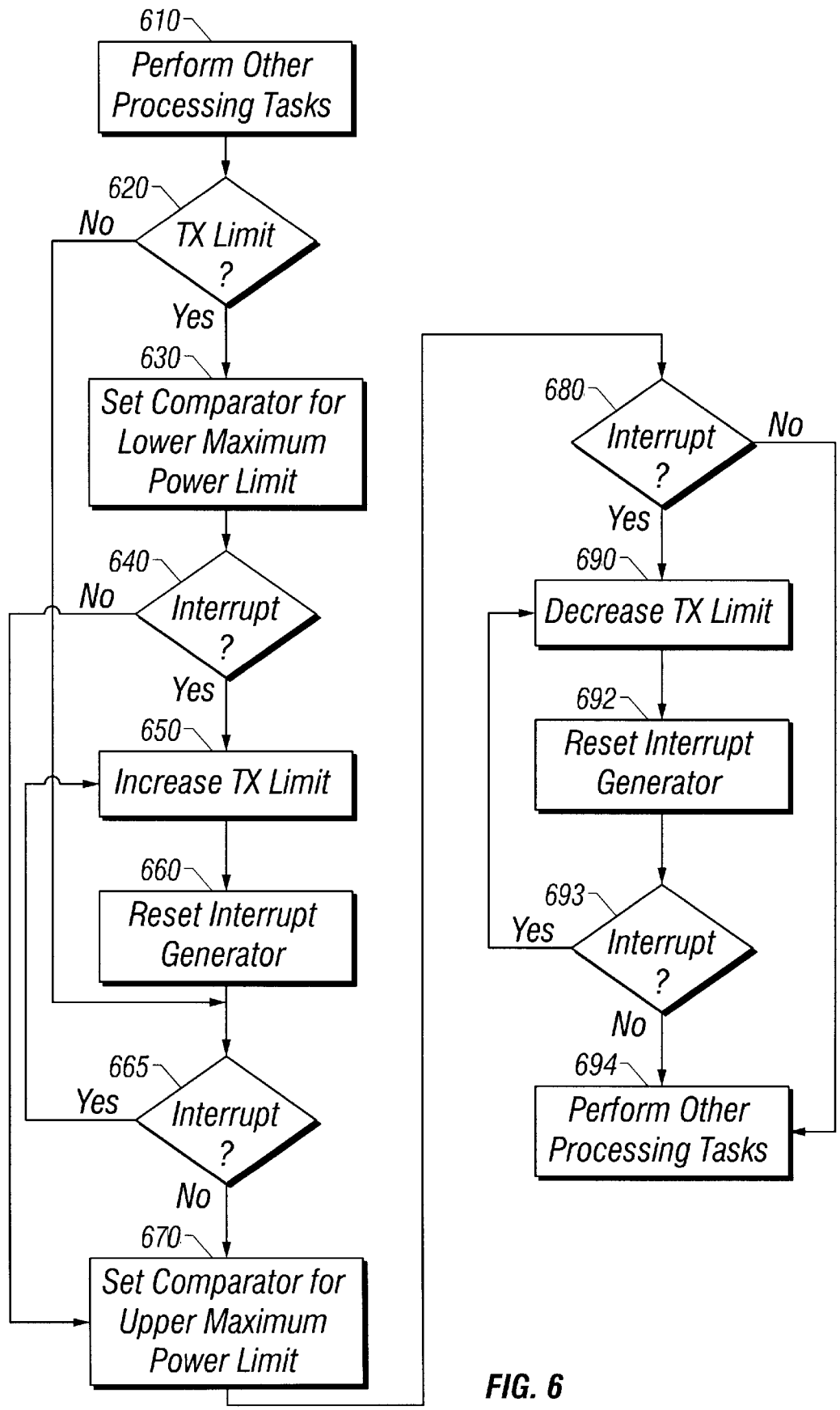
FIG. 6 is a flowchart showing one mode of operation of the digital controller in FIG. 1 when the reference signal represents both upper and lower power limit for the transmitted power.

Referring back to FIG. 5, when two parallel interrupt paths are implemented in the power control loop, the operation is similar to the process shown in FIG. 6 except that there is no need to reconfigure the comparator 118. The high and low reference signals are simultaneously compared to the transmitted power in parallel to determine whether the maximum transmitted power stays within the desired range.

The above event-driven power control techniques can be used for power control in TDMA cellular phone systems (e.g. IS-54 TDMA standard). A TDMA system assigns three users to share a 20 msec transmission time slot in a frequency channel with each user occupying 6.67 msec for data transmission. Each user's 6.67 msec time slot is further divided into small sections for transmission of voice data and other overhead data for, e.g., handshaking. Different data is specified with a different power level. Each power level is characterized by a mean effective radiated power ("ERP"). The transmitted power in a particular small section is required to a specified ERP. For example, IS-137 TDMA standard and analog cellular phone systems specify that the transmitted power must be maintained at a respective ERP within a range from a −4 dB to +2 dB.

Preferably, the power control loop of FIG. 4 is used for a TDMA power control. The upper and lower maximum power limits are set at the maximum upper deviation level (e.g., +2 dB) and the maximum lower deviation level (e.g., −4 dB) from a specified ERP. Since a frequency channel is shared by multiple users in time domain, a deviation of a user's power level memory unit in one time slot is used to adjust the power in the next time slot. Hence, the digital controller needs to allocate certain memory to store the interrupt signal for a user.

In operation, the digital controller is commanded to perform a power adjustment only when an interrupt is raised. The amount of adjustment is predetermined to reduce the processing load of the digital controller.

Although the present invention has been described in detail with reference to a few preferred embodiments, various modifications and enhancements may be made without departing from the appended claims.

For example, other frequencies than the ones stated herein could be used.

What is claimed is:

1. A radio transceiver, comprising:

a signal transmission circuit receiving an IF signal to produce an RF signal, wherein said signal transmission circuit includes a variable gain amplifier operable to amplify said IF signal and thereby increase power of said RF signal, said variable gain amplifier operable to change a gain in amplifying said IF signal in response to a gain control signal;

an RF power detector connected to said signal transmission circuit, measuring an output power level of said RF signal to produce a detector signal indicating said output power level;

a comparator connected to said RF power detector to receive said detector signal and configured to compare said detector signal to a first reference signal indicative of a first power limit for said signal transmission circuit, said comparator producing a comparator output to indicate which of said detector signal and said first reference signal is greater;

an interrupt generator connected to receive said comparator output and configured to generate an interrupt signal only when said comparator output indicates a predetermined relation between said detector signal and said first reference signal, wherein said interrupt signal is independent of a quantitative amount of a difference between said detector signal and said first reference signal; and a digital controller communicating with said interrupt generator and responding to said interrupt generator to cause generation of said gain control signal only when said interrupt signal is generated, wherein said digital controller sends a reset signal to terminate said interrupt signal and further response to said interrupt generator after generation of said gain control signal and resumes a response to said interrupt generator only when another interrupt signal is received.

2. A radio transceiver as in claim 1, wherein said first power limit represents a predetermined maximum limit and said digital controller responds to said interrupt signal and causes said gain control signal to limit said gain of said variable gain amplifier so that a maximum power of said RF signal is below said maximum allowable power.

3. A radio transceiver as in claim 2, wherein said comparator further compares said detector signal to a second reference signal indicative of a predetermined lower power limit for said maximum power of said RF signal, said interrupt generator commanding said digital controller to maintain said maximum power of said RF signal above said predetermined lower power limit by increasing said gain of said variable IF amplifier when a corresponding interrupt signal is generated.

4. A radio transceiver as in claim 3, wherein said comparator includes first and second signal inputs for receiving said detection signal and one of said first and second reference signals; said comparator output represents a difference between signals from said first and second signal inputs; and said comparator is configured to receive a polarity control signal which controls said comparator to receive said detection signal from said first signal input and said first reference signal from said second signal input when said output power level of said RF signal is compared to said maximum limit and controls said comparator receive said detection signal from said second signal input and said second reference signal from said first signal input when said maximum output power level of said RF signal is compared to said lower power limit.

5. A radio transceiver, comprising:

a signal transmission circuit receiving an IF signal to produce an RF signal, wherein said signal transmission circuit includes a variable gain amplifier operable to amplify said IF signal and thereby increase power of said RF signal, said variable gain amplifier operable to change a gain in amplifying said IF signal in response to a gain control signal;

an RF power detector connected to said signal transmission circuit, measuring an output power level of said RF signal to produce a detector signal indicating said output power level;

a comparator connected to said RF power detector to receive said detector signal and configured to compare said detector signal to both a first reference signal indicating a predetermined upper power limit and a second reference signal indicating a predetermined lower power limit for said signal transmission circuit, said comparator producing a comparator output to indicate whether said output power level exceeds an allowable power range defined by said upper power limit and said lower power limit;

an interrupt generator connected to receive said comparator output and configured to generate an interrupt signal only when said output power level of said RF signal exceeds said allowable power range, wherein said interrupt signal is independent of a first quantitative difference between said detector signal and said first reference signal or a second quantitative difference between said detector signal and said second reference signal; and a digital controller communicating with said interrupt generator and responding to said interrupt generator to cause said gain control signal only when said interrupt signal is generated, wherein said digital controller sends a reset signal to terminate said interrupt signal and further response to said interrupt generator after generation of said gain control signal and resumes a response to said interrupt generator only when another interrupt signal is received.

6. A radio transceiver, comprising:

a signal transmission circuit receiving an IF signal to produce an RF signal, wherein said signal transmission circuit includes a variable gain amplifier operable to amplify said IF signal and thereby increase power of said RF signal, said variable gain amplifier operable to change a gain in amplifying said IF signal in response to a gain control signal;

an RF power detector connected to said signal transmission circuit, measuring an output power level of said RF signal to produce a detector signal indicating said output power level;

a first signal comparing circuit connected to said RF power detector, operating to compare said detector signal to a first reference signal indicating a predetermined upper power limit and produce a first interrupt signal only when said output power level is greater than said upper power limit, wherein said first interrupt signal is independent of a first quantitative difference between said detector signal and said first reference signal;

a second signal comparing circuit connected to said RF power detector in parallel with said first signal comparing circuit, operating to compare said detector signal to a second reference signal indicating a predetermined lower power limit and produce a second interrupt signal only when said output power level is less than said lower power limit, wherein said second interrupt signal is independent of a second quantitative difference between said detector signal and said second reference signal; and a digital controller operating to respond to said first and second signal comparing circuits to cause said gain control signal only when an interrupt signal is generated, wherein said digital controller sends a reset signal to terminate said interrupt signal and further response to said first and second signal comparing circuits after generation of said gain control signal and resumes a response to said first and second signal comparing circuits only when another interrupt signal is received.

7. A radio transceiver as in claim 6, wherein each of said first and second signal comparing circuits comprises a signal comparator to perform said comparing and an interrupt generator to produce said first interrupt signal or second interrupt signal according to an output of said comparator.

* * * * *